(12) United States Patent
Hays et al.

(10) Patent No.: US 6,637,379 B2
(45) Date of Patent: Oct. 28, 2003

(54) ACCELERATED WATER EVAPORATION SYSTEM

(75) Inventors: Herbie Jack Hays, Grand Junction, CO (US); William Merle Hays, Grand Junction, CO (US); Arturo Quezada, Clifton, CO (US)

(73) Assignee: A. Western Pump & Dredge, Inc., B. Grand Junction, CO (US)

( * ) Notice: Subject to any disclaimer, the term of this patent is extended or adjusted under 35 U.S.C. 154(b) by 0 days.

(21) Appl. No.: 10/258,635
(22) PCT Filed: Apr. 24, 2001
(86) PCT No.: PCT/US01/13115
§ 371 (c)(1), (2), (4) Date: Oct. 24, 2002
(87) PCT Pub. No.: WO01/81824
PCT Pub. Date: Nov. 1, 2001

(65) Prior Publication Data
US 2003/0062004 A1 Apr. 3, 2003

Related U.S. Application Data
(60) Provisional application No. 60/199,289, filed on Apr. 24, 2000.

(51) Int. Cl.⁷ .................................................. F22B 27/16
(52) U.S. Cl. .................... 122/40; 122/51; 126/350 B; 159/26.1; 159/28.4
(58) Field of Search .................... 122/40, 44.1, 44.2, 122/51, 55, 72, 446, 448.1; 392/451, 485, 497; 126/350 B, 351, 369; 159/26.1, 28.1, 29, 46, 28.4

(56) References Cited
U.S. PATENT DOCUMENTS 2,343,458 A   3/1944   Hettinger .................... 21/117
3,511,236 A   5/1970   Conlin et al. ................ 128/187
3,546,428 A  12/1970   Omohundro ................ 219/271

(List continued on next page.)

OTHER PUBLICATIONS

"ENCON—Entrainment Contained Evaporator", PSI Water Systems, http://www.evaporator.com/encon.html, Apr. 22, 2001, 4 pages.

"Industrial All–Electric Wastewater Evaporator", HBE Series, Landa Water Cleaning Systems, http://www.landa-inc.com/pages/evaporators.asp?src=showModList&Series=52, Apr. 22, 2001, 1 page.

"Industrial Natural–Gas Wastewater Evaporator", HBG Series, Landa Water Cleaning Systems, http://www.landa-inc.com/pages/evaporators.asp?src=showModList&Series=51, Apr. 22, 2001, 5 pages.

"Industrial Wastewater Evaporator with Submerged Combustion Technology", WB Series, Landa Water Cleaning Systems, http://www.landa-inc.com/pages/evaporators.asp?src=showModList&Series=53, Apr. 22, 2001, 4 pages.

*Primary Examiner*—Gregory Wilson
(74) *Attorney, Agent, or Firm*—Santangelo Law Offices P.C.; Craig R. Miles (57) ABSTRACT

A liquid to gas converter to convert liquids (1) to gas (2) that can include a liquid pressurization element (3), a liquid preheating element (5), and a nozzle (10) to disperse liquids into energy (7) generated by an energy source (8). The gas to liquid converter can be located inside an enclosure (17) and substances dissolved in the liquid can accumulate as solids (13) on deposition surface (12) of the enclosure as the liquid (1) converts to gas Cis (2). Condensation of a portion of the gas (2) generated can be combined with the solids (13) for continuous removal of such solids (13) from the enclosure (17). A gas expansion compensator can generate a pressure gradient (24) to move the volume of gas generated from the liquid from the enclosure (17).

39 Claims, 6 Drawing Sheets

U.S. PATENT DOCUMENTS

| | | | |
|---|---|---|---|
| 3,695,066 A | 10/1972 | Doyel | 68/222 |
| 3,742,629 A | 7/1973 | Plasko et al. | 38/69 |
| 3,745,306 A | 7/1973 | Naritomi | 392/335 |
| 3,864,252 A * | 2/1975 | Morin et al. | 203/10 |
| 3,870,585 A | 3/1975 | Kearns et al. | 159/4 A |
| 4,184,457 A * | 1/1980 | Trotter et al. | 122/448.1 |
| 4,399,349 A | 8/1983 | Deming et al. | 219/276 |
| 4,449,849 A | 5/1984 | Horn et al. | 405/52 |
| 5,082,525 A | 1/1992 | Travis | 159/16.1 |
| 5,240,560 A * | 8/1993 | Gregory | 159/16.1 |
| 5,322,216 A | 6/1994 | Wolter et al. | 236/25 R |
| 5,582,680 A | 12/1996 | Vankouwenberg et al. | 159/23 |
| 5,586,547 A | 12/1996 | Nixon | 126/351 |
| 5,666,910 A | 9/1997 | George, II et al. | 122/40 |
| 5,775,840 A | 7/1998 | Knieper et al. | 405/128 |
| 6,131,536 A | 10/2000 | Kujawa | 122/14.22 |
| 6,200,428 B1 * | 3/2001 | VanKouwenberg | 202/160 |

* cited by examiner

ACCELERATED WATER EVAPORATION SYSTEM

This application is the United States National Stage of International Patent Application No. PCT/US01/13115, filed Apr. 24, 2001, which claims the benefit of U.S. Provisional Patent Application No. 60/199,289, filed Apr. 24, 2000, each hereby incorporated by reference.

I. TECHNICAL FIELD

A system for the conversion of liquids to gases that may be used in the context of various technologies to reduce the volume of liquids, remove and accumulate dissolved solids from liquids, produce distillates, purify water, introduce liquids into the surrounding environment or the watershed, generate expansion gases as a source of energy, or the like. Specifically, certain embodiments of the invention can be used to accelerate the evaporation of liquids that are produced from oil and gas well drilling and completion processes.

II. BACKGROUND

Liquids can pose significant problems with respect to transportation, storage, disposal; volume reduction, distillation, or purification; or contaminant deposition, precipitation, or accumulation, and the like. Certain of these problems have been made more acute by recent changes in federal and state laws that have generated more stringent environmental regulations with respect to storage or disposal of liquids by containment in ponds, pits, or the like. In the context of oil or gas drilling, for example, ponds or reserve pits that hold liquids (such as water generated during the drilling operations) may have to be emptied and reclaimed within 30 days of finishing the well drilling or completion process. As a result, there is an increasing market demand for cost effective liquid to gas conversion devices (liquid-gas converters), or liquid to gas conversion methods, that can be used to convert liquids to their corresponding vapors, gases, or the like (water to steam as an example), remove contaminants from liquids, reduce the volume of liquids, or prepare liquids for direct introduction into the environment or watershed.

As an example, oil or gas well drilling and completion processes may produce very large amounts of water to handle or dispose of (15,000 barrels of water is not unusual). Because liquids generated from drilling activities may contain high levels of contaminants, dissolved solids, or contain oil, gas, or other organic materials, such liquids should not be released directly into the surrounding environment or into the watershed. As such, liquids generated from well drilling operations are typically left for long periods of time to slowly evaporate. Under recently promulgated regulations, however, liquids may not remain in reserve pits to evaporate for such long periods of time, and removal of liquids from remote locations may be impossible or simply impracticable.

While other examples of liquid handling, storage, or disposal problems may be provided within the context of the oil or gas industry, other industries, including both small and large businesses, also have liquid management problems relating to conversion of liquids to gases, the reduction of liquid volume, removal of contaminants from liquids, purification of liquids, distillation of liquids, disposal of liquids, or processing of liquids for direct release into the environment, the watershed, or into sewage systems.

Because the demand for liquid-gas converters or methods of converting liquids to gases, vapors, of the like is increasing, an increasing number and variety of liquid-gas converters and methods of converting liquids to gases are now available to the consumer. Even though there is an increased number and variety of liquid-gas converters and methods for converting liquids to gas available to the consumer a number of significant problems remain unresolved with respect to converting liquids to gas, reducing the volume of liquids, the removal, deposition, or accumulation of contaminants from liquids, or the processing of liquids for direct release into the environment, watershed or sewage system.

A significant problem with existing liquid management technology may be that natural liquid evaporation rates are slow. As a result, numerous liquid-gas converters, or liquid evaporation facilitation methods, have been devised to accelerate natural evaporation or liquid to gas conversion processes. For example, efforts to facilitate the evaporation of liquids include those disclosed in U.S. Pat. No. 4,449,849, hereby incorporated by reference. The patent discloses facilitating the evaporation rate of water by spraying water from a liquid containment pond, pit, or the like into the atmosphere and recollection of the water in the pit to be re-sprayed. However, liquid spraying methods may still be too slow for operators to meet statutory reclamation deadlines, may be effected by or not work at lower temperatures, or may not meet environmental statutory or regulatory requirements. A practical problem with spraying liquids into the atmosphere to accelerate evaporation may be that wind will carry the sprayed water away from the containment area and contaminate the surrounding soil or may percolate to the underlying ground water.

Another significant problem with existing liquid management technology may be that it is incompatible or impractical to use with large volumes of liquid. Many applications require the conversion of hundreds of gallons or thousands of gallons of liquid per hour. Many liquid to gas converters, or methods of converting liquid to gas, are for individual or personal use such as facial saunas, air humidifiers, hair dressing, steam irons, or the like, as disclosed by U.S. Pat. Nos. 4,399,349; 2,343,458; 3,546,428; 3,695,066; 3,742,629; 3,511,236; 3,745,306; each hereby incorporated by reference. Even liquid to gas converters that are specifically manufactured for the reduction of substantial volumes of liquid have a practical range of application in the tens of gallons or hundreds of gallons per hour. Typically, liquid-gas converters do not have an evaporation rate exceeding 200 gallons per hour. See for example, Encon Entrainment Contained Evaporator, PSI Water Systems, Inc., http://www.evaporator.com, or Landa, Inc. http://www.landa-inc.com, each hereby incorporated by reference.

Another significant problem with existing liquid management technology may be that liquid is heated in an open container to convert the liquid to a gas. One aspect of this problem, may be that the liquid cannot be heated substantially above the boiling point of the liquid to facilitate the conversion of the liquid to a gas. As can be understood, liquids within a container are heated, certain molecules having higher than average energy escape the liquid as a gas, because molecules of higher energy are lost the remaining molecules of liquid cannot achieve substantially higher energy, as such the remaining liquid(s) maintain a temperature which does not substantially exceed its (their) respective boiling point(s). A related aspect of this problem may be that liquids heated in an open container may not be pressurized so that the temperature of the liquid may be substantially increased above the liquid(s) respective boiling point(s). Another aspect of this problem may be that liquids can be very alkaline or very acidic, depending on the concentration of substances dissolved in the liquids, and such liquids may damage the container or other components submersed in the liquid. As such, the container and other submersed components may have to be constructed of more expensive materials such as stainless steel as disclosed by U.S. Pat. No. 5,582,680, hereby incorporated by reference. See also, Encon Entrainment Contained Evaporator, PSI Water Systems, Inc., http://www.evaporator.com; and Landa, Inc., http://www.landa-inc.com.

Another significant problem with existing liquid management technology may be that substances dissolved in a liquid are difficult to isolate, accumulate, or remove from deposition surfaces. These substances may include metals, minerals, greases, oils, soaps, road film, organic compounds, or the like. For example, the "Samsco" water evaporator disclosed by U.S. Pat. No. 5,082,525, hereby incorporated by reference, heats liquid in a container with a serpentine heat exchanger submersed in the liquid. Substances precipitate and then accumulate in the container as liquid evaporates. These precipitates or residual solids must then be periodically removed, either automatically or manually, from the container, and the heat exchanger or other components cleaned of baked on precipitates or residual solids. Similarly, the water evaporator disclosed by U.S. Pat. No. 5,582,680 discloses that sediment and other contaminants are removed after operation.

Another significant problem with existing liquid management technology may be that the devices cannot be run continuously. One aspect of this problem can be that the device cannot process or has a reduced processing capability during the period in which it is being recharged with additional liquid. This may be due to a reduction in the temperature of the liquid to be processed or due to the fact that the unit must suspend processing entirely to be recharged. A second aspect of this problem may be that the device cannot process additional liquid because solids, precipitates, or concentrates must be removed, or the device otherwise cleaned prior to the processing of additional liquid. For example, the Landa WB series provides an auto purge feature that empties the concentrate from the evaporator device after liquid reduction and during the auto purge process additional liquid cannot be processed.

Another significant problem with existing liquid management technology may be that exhaust fans or blowers are required to move gases generated by conventional liquid-gas converters, or to move exhaust from the combustion of fuels. As can understood from U.S. Pat. No. 5,582,680 vapor flow is encouraged by a blower by drawing in outside air. Similarly, the Landa evaporators and the Encon evaporators use built in exhaust fans to move steam and combustion gases from the processing of liquids. As such, to the extent that these conventional types of liquid to gas converters have blowers, fans, or the like to move generated gas, steam, vapor, or the like, they may be more complex, require greater maintenance, be more costly to build, or be more prone to failure than less complex liquid-gas converters.

Another significant problem with existing liquid management technology may be that liquids are transported to storage or disposal sites. One aspect of this problem is the high cost of transporting the liquids from the site of generation to the storage or disposal facility. Since liquids may be continuously generated, the expense of transporting, storage, or disposal can be an ongoing expense for the life of a business, or for the life of an oil or gas well. A second aspect of this problem can be cradle-to-grave laws that may make the generator of the liquid liable for any injury or damage caused by the liquid during transportation, or even liable during the entire period of storage, disposal, or upon return to the environment or watershed.

As can be understood from the foregoing significant problems remain unresolved with respect to liquid management or liquid to gas conversion. The instant invention addresses each of the above-mentioned liquid management or liquid to gas conversion problems.

III. DISCLOSURE OF THE INVENTION

The invention comprises various embodiments of liquid to gas conversion apparatus and methods of converting liquids to their respective gases. Liquids may be generated as the residue of an industrial process, such as used cleaning solutions or liquid waste from sewage treatment, or may be generated during oil or gas drilling and carried to the surface, or may be produced naturally as precipitation, as examples. It should be understood that the invention may be used with a wide variety of liquids or mixture of liquids from numerous industrial, business, or natural sources, and even though many embodiments of the invention as described have applications related to accelerated evaporation of water, the description is not intended to limit the invention to the liquid to gas conversion of water.

Further, it should be understood that gases resulting from the application of the invention can include those molecules that are the gas phase of any substance having a liquid phase that can be dispersed and converted to gas, and such gas can also include, but are not limited to, vapor, steam, or the like. The production of such gases, vapors, steam or like resulting from use of the invention can be used in or to effect numerous applications including, but not limited to, the complete or partial conversion of a volume of liquid to a gas, liquid volume reduction, the recovery of substances associated with the liquid, the use of expanding gases for energy, the production of distillates, the preparation of liquid to be returned to the environment as gases or as liquids, or the preparation of liquid to be returned to the watershed.

Certain embodiments of the invention relate to apparatus or methods that include a liquid-gas converter. A liquid-gas converter can be understood to comprise a liquid and a sufficient amount of energy to convert a portion of the liquid to a gas. Energy may include, but is not limited to, heat, whether from the conversion of electricity, oil, gasoline, kerosene, natural gas, propane, coal, or the like. While many of the examples describe energy from the combustion of natural gas (in some cases natural gas obtained directly from gas wells that are also producing the liquid to be converted to gas, i.e. in situ) it should be understood that the invention is not limited to the use of natural gas or other conventional fuels, and even exotic forms of energy, such as microwave, nuclear fuels, or the like should be understood to be included.

As can be easily understood from the foregoing, the basic concepts of the present invention may be embodied in a variety of ways including various permutations and combinations of the various elements. As such the objects of the invention are similarly numerous and varied. It is therefore, a significant object of embodiments of the invention to convert volumes of liquid to gas. Because the liquid to gas conversion aspects of the invention can be scaled up or down, the volume of liquid converted to gas may be a few gallons of liquid per hour to thousands of gallons of liquid per hour. Specifically, as an example, an object of the invention can be to convert 15,000 barrels of water at a gas well drilling site to gas in less than thirty days.

Another significant object of the invention can be to reduce the volume of liquids, including waste water, by evaporation, and recovery of non-volatile liquids and other contaminants.

Another significant object of an embodiment of the invention can be to provide substantially continuous liquid to gas conversion. One aspect of this object of invention can be to obviate, reduce, or manage the accumulation of substances associated with the liquid during the evaporation process in a manner that does not require taking the liquid-gas converter off line for recharging with liquid, removal of accumulated precipitates, or for the cleaning of components. Another aspect of this object of the invention can be to maintain the temperature of liquids even when recharging the liquid-gas converter with additional liquid so that the level of liquid to gas conversion efficiency can be maintained.

Another significant object of an embodiment of the invention can be to pressurize the liquid prior to conversion of the liquid to a gas. One aspect of this object can be to provide sufficient pressure to prevent the liquid from being converted to gas even when the liquid is heated to temperatures that are substantially above the liquids boiling point at standard atmospheric pressure (1 atmosphere). Specifically, an aspect of this object can be to sufficiently pressurize water so that it can be heated in a range between about 100 degrees Fahrenheit to about 1000 degrees Fahrenheit.

Another significant object of an embodiment of the invention can be to generate a pressure gradient responsive to the expanding gases generated during the liquid to gas conversion, wherein the pressure gradient has sufficient change in atmospheric pressure per unit distance to move the expanding gases away from the liquid-gas converter. Specifically, one aspect of this object of the invention is to generate such pressure gradient without the use of conventional air movers such as fans, blowers, or the like.

Another significant object of an embodiment of the invention can be to remove substances associated with, or dissolved in, the liquid being converted to a gas. One aspect of this object can be to provide a deposition surface on which solids can accumulate during the conversion of liquid to a gas. A second aspect of this object of the invention can be to provide continuous removal of solids from the deposition surface during the process of converting liquids to gases.

Another significant object of an embodiment of the invention can be to produce distillates of the liquids being converted from liquid to gas. This object of the invention can include methods which condense substantially all the gas or a portion of the gas produced.

Another significant object of an embodiment of the invention can be to prepare liquids for reintroduction into the environment. One aspect of this object of the invention can be to convert liquid to gases that are then released into the atmosphere. Another aspect of this object of the invention can be to condense gases from the liquid-gas conversion for release into the surrounding watershed.

Another significant object of an embodiment of the invention can be to use the energy from the expanding gases from the liquid-gas conversion. One aspect of this object may be to drive a turbine, reciprocal to rotational energy transfer device, or the like to provide mechanical energy to operate other devices including, but not limited to, electrical generators.

Another significant object of an embodiment of the invention can be to substantially eliminate transportation, storage, or off site disposal of liquids. One aspect of this object can be to substantially eliminate costs associated with these activities. A second aspect of this object can be to substantially eliminate the liability of these activities.

Another significant object of an embodiment of the invention can be to provide a portable liquid to gas converter that can be used on site to convert liquids produced during the drilling of oil or gas wells, or during completion processes, to gases that can be released into the atmosphere or liquids that can be introduced into the surrounding watershed.

Another significant object of an embodiment of the invention can be to use natural gas produced at a well head at a low enough volume or pressure during the liquid-gas conversion process such that it has essentially no effect on the ongoing production rates of the well.

Yet another object of an embodiment of the invention can be to provide a method of accelerated water evaporation which may be environmentally acceptable from both a regulatory and a consumers perspective.

Still another object of an embodiment of the invention can be to dispose of water in a manner which substantially eliminates the long term problems of water production during the production life of an oil or gas well.

Another object of an embodiment of the invention can be to provide an accelerated water evaporation system that can be cost effective both with respect to operation but also with respect to maintenance.

Naturally, further independent objects of the invention are disclosed throughout other areas of the specification.

V. MODE(S) FOR CARRYING OUT THE INVENTION

The invention relates to apparatuses and methods for the conversion of liquids to gases. Several basic embodiments of the invention are first described followed by preferred embodiments of the invention including the best mode of use.

Figure 1:
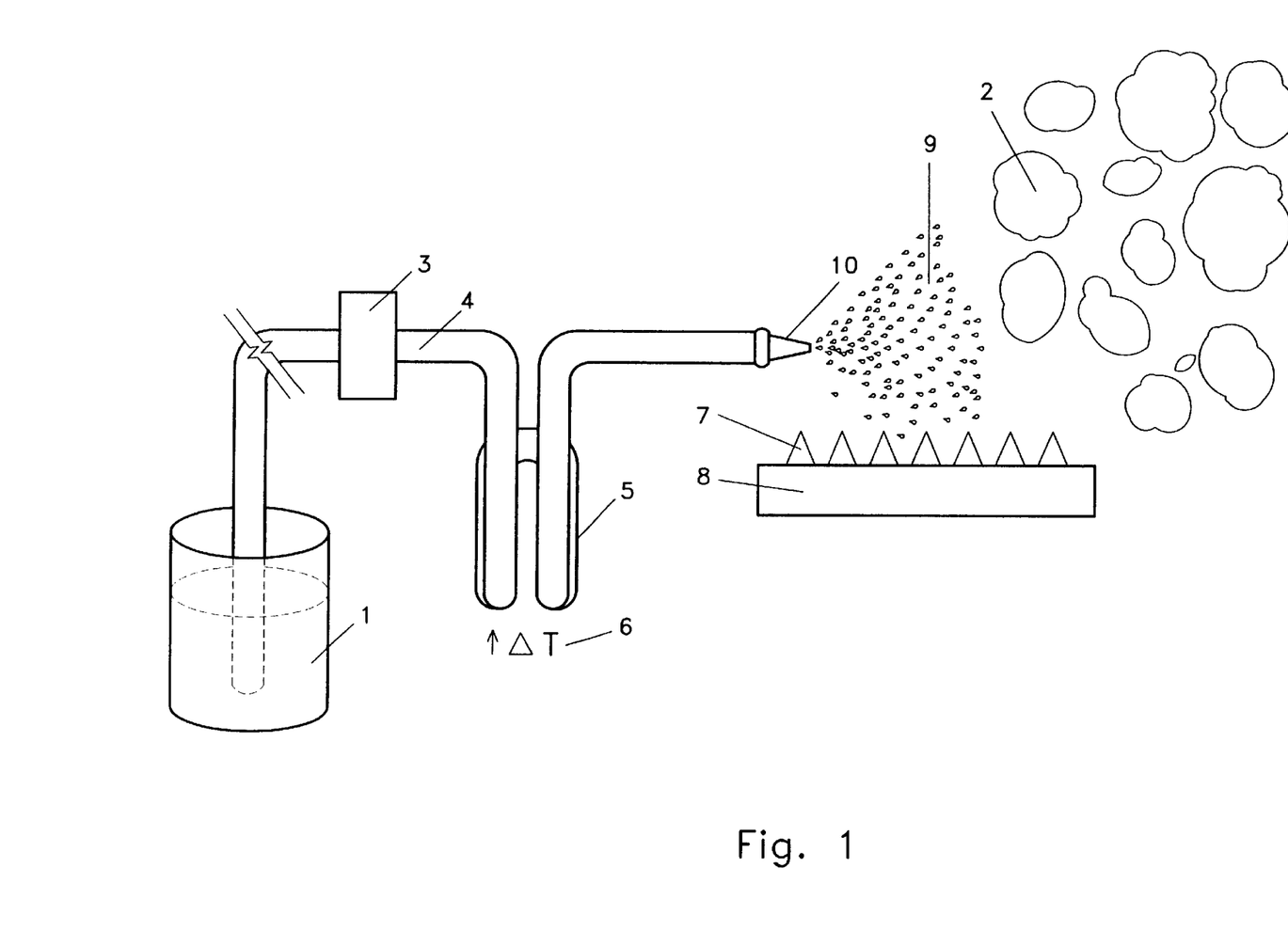
FIG. 1 illustrates a basic embodiment of the invention in which liquid is pressurized, preheated, and dispersed from a nozzle into energy from an energy source.

First referring to FIG. 1, an embodiment of the invention to convert a liquid (1) to a gas (2) is illustrated. With respect to embodiments of the invention of this type, a pressurization element (3) is responsive to liquid (1). In certain embodiments of the invention, the pressurization element (3) can comprise a positive displacement type pump. Alternately, in other embodiments of the invention the pressurization element (3) can comprise compressed air means. With respect to the operation of the compressed air means, compressed air can be forced into the liquid (1) within a liquid compression zone (4). The liquid compression zone can for example be a length of tube, a closed container, or the like. As the compressed air displaces the liquid into an increasingly smaller volume, the liquid is subjected to increasing pressure. Whether the pressurization element is a conventional pressure pump or a less conventional liquid pressurization means, such as compressed air, the pressurization element (3) can pressurize the liquid to between 100 pounds per square inch to about 3000 pounds per square inch, or even greater pressures.

The invention may further comprise, a liquid preheating element (5) which is responsive to a heat source (6). The liquid preheating element (5) transfers heat from the heat source (6) to the liquid (1) that has been pressurized as discussed above. The liquid preheating element (5) provides additional surface area responsive to the liquid whereby sufficient heat can be transferred to substantially raise the temperature of the liquid to the desired level. While the preheating element (5) can comprise additional length of tubing (coiled or folded) as shown in FIG. 1, it can comprise most any configuration that provides an increased liquid-surface interface area for heat (6) transfer.

Depending on the pressure that the liquid is under, the liquid (1) can be heated between a wide range of temperatures, such as between about 150 degrees Fahrenheit to about 1000 degrees Fahrenheit, or even higher temperatures. As an example, liquid to gas conversion of about 8 gallons per minute can be accomplished when the liquid is pressurized to about 2,000 pounds per square inch and preheated to about 250 degrees Fahrenheit. Increased volumes of liquid can be converted to gas by simultaneously increasing the pressure and temperature of the liquid prior to dispersing it into energy (7) from an energy source (8).

The pressurized and preheated liquid (9) can be dispersed through at least one nozzle (9) or a plurality of nozzles. As the pressurized and preheated liquid is dispersed into atmospheric pressure, the boiling point of the liquid is reduced below the actual temperature of the preheated liquid and a substantial portion of the liquid can convert to gas without additional input of energy (7). Energy (7) can be provided from energy source (8) to convert the remaining liquid (1) to gas (2). As can be understood, liquid pressure, preheating temperature, rate of dispersement through the nozzle(s), or the amount of energy (7) can each be adjusted as desired to convert a desired amount of liquid (1) to gas (2).

For example, in applications where about 4 gallons per minute to about 12 gallons per minute of pressurized, preheated liquid (9) is dispersed from nozzle (10) per minute and substantially all the liquid is converted to gas (2), the liquid can be first pressurized to about 2000 pounds per square inch and then preheated to about 350 degrees Fahrenheit prior to being dispersed. A burner generating between about one million and three million British Thermal Units per hour can comprise the energy source (8). Specifically, a burner such as an SB 38/24-14 2.5 MM BTU/hour can be used in this application.

Certain embodiments of the invention that use a burner as the energy source (8) can be fueled with oil, natural gas, propane, kerosene, or the like which is ignited to produce a continuous flame and further allows for delivering preheated liquid (9) dispersed from the nozzle (10) directly into the flame which can improve the efficiency of liquid to gas conversion.

Figure 2:
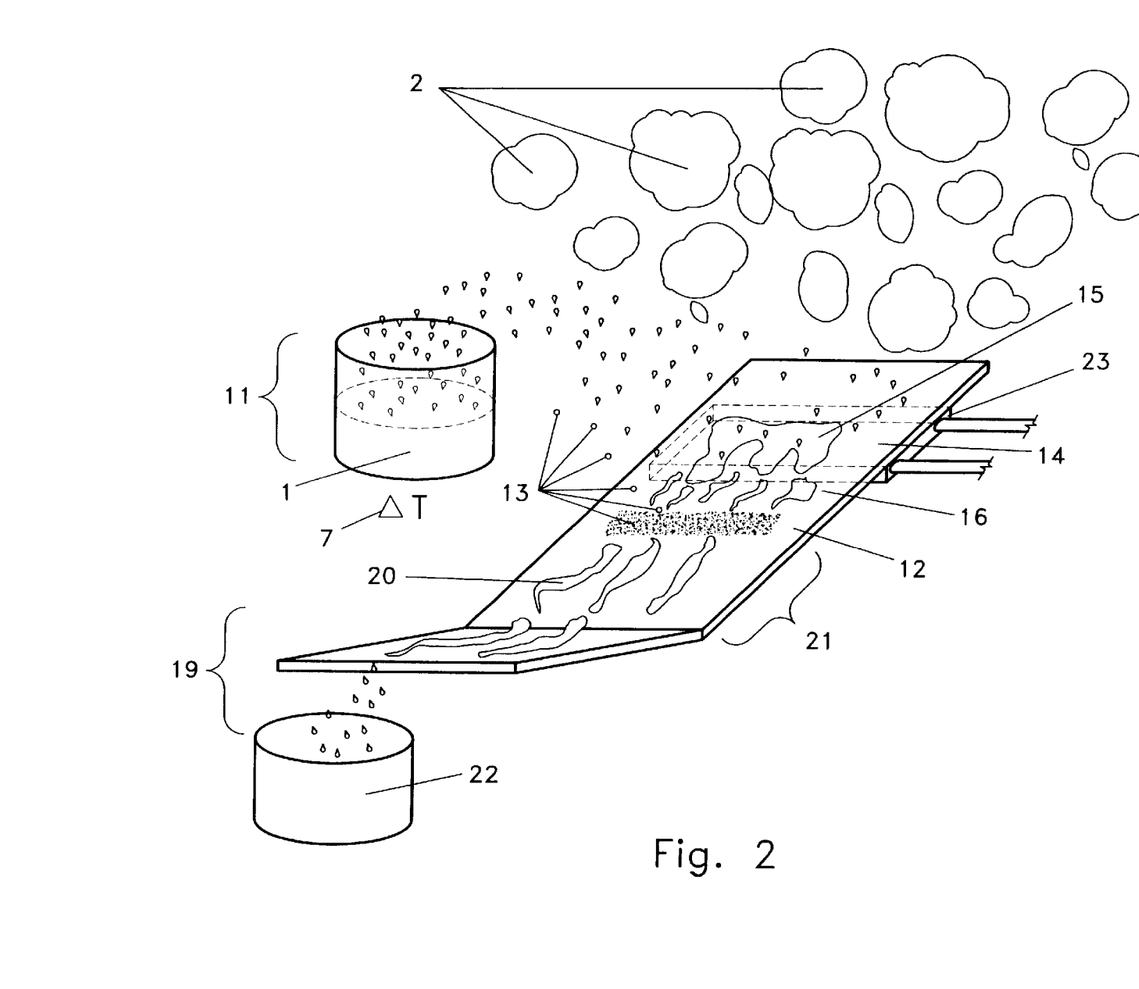
FIG. 2 illustrates a basic embodiment of the invention that provides a deposition surface for solids, a condensation surface, a condensate transfer surface and a gravity collection element for automatic removal of deposited solids from a gas-liquid converter.

Now referring to FIG. 2, embodiments of the invention can comprise a liquid (1) containing dissolved substances (which may be of varying concentrations) to a gas (2) by using a liquid-gas converter (11). The invention can comprise a deposition surface (12) on which solids (13) accumulate as the liquid coverts to gas, a condensation surface (14) on which a portion of the gas converts to a condensate (15), and a condensate transfer surface (16) configured to combine the condensate (15) with the solids (13), whereby at least a portion of the solids (13) are dissolved in the condensate (15) to form a solution (20). The deposition surface (12), the condensation surface (14), and the condensate transfer surface can comprise separate components that are coupled together, or they can be contiguous surface as shown by FIG. 2.

Certain embodiments of the invention further comprise an enclosure (17) as shown in FIG. 3 in which the liquid-gas converter (11) is located and a portion of the interior surface (18) of the enclosure can define the deposition surface (12), the condensation surface (14), and the condensate transfer surface (16). The invention may further comprise a solution removal system (19) where a gravity collection element (21) transfers the solution (20) to a solution repository (22).

As can be understood, the liquid-gas converter can be the type shown by FIG. 1 and as above-described. In the instant embodiments being described the nozzle (10) and the energy source (8) which provides energy (7) can be located within the enclosure (17). Unlike conventional liquid to gas conversion technology, as liquid (1) is converted to gas (2), solids (13), which can no longer stay in solution, accumulate on the deposition surface (12) which can be the interior surface (18) of enclosure (17). The temperature of the condensation surface (14) can be controlled by a cooling element (23) coupled to the exterior surface of the enclosure (17) to allow a portion of the gas to condense on the condensation surface (14) as condensate (15). As an alternative to allowing condensate to form, the volume of liquid (1) dispersed by the nozzle (10) can be adjusted to disperse a volume of liquid (1) which is in excess of the liquid to gas conversion rate. The amount of excess liquid dispersed may be in the range of about one percent to about five percent of the total amount of volume dispersed, or may be any amount of desired excess volume of liquid. The enclosure (17) can be configured to allow the force of gravity to move the condensate (15), or excess volume of liquid, over the condensate transfer surface (16) to combine the condensate (15), or excess volume of liquid, with the accumulated solids (13) to form a solution (20). The solution can then move over the gravity collection element (21) and then flow to the solution repository (22). Embodiments of the invention which incorporate the deposition surface, condensation surface, condensate transfer surface and the solution removal system can be operated continuously for extended periods of time.

Unlike conventional liquid-gas converters which may have to be shut down or taken off line for periodic removal of accumulated precipitates, solids, or other non-volatile substances, and may also require cleaning of components to remove baked on solids, prior to conversion of additional amounts of liquid, the instant invention continuously removes accumulated solids automatically in a reduced volume of solution.

Now referring to FIG. 3, certain embodiments of the invention may further comprise a gas expansion compensator (24). The gas expansion compensator (24) generates a pressure gradient (25) within an enclosure (17). The pressure gradient (25) has sufficient change in atmospheric pressure per unit distance to move the volume of gas (2) generated from the liquid to gas conversion toward one of at least two apertures (26) of the enclosure (17). In conventional liquid-gas converters the pressure gradient can be produced using motorized fans, blowers, or the like. Unlike conventional liquid to gas converters, embodiments of the instant invention generate the pressure gradient with the liquid (1) prior to being converted to gas. In certain embodiments of the invention, the liquid (1) dispersed from the nozzle (10) can be adjusted to generate the pressure gradient within the enclosure (17).

Figure 3:
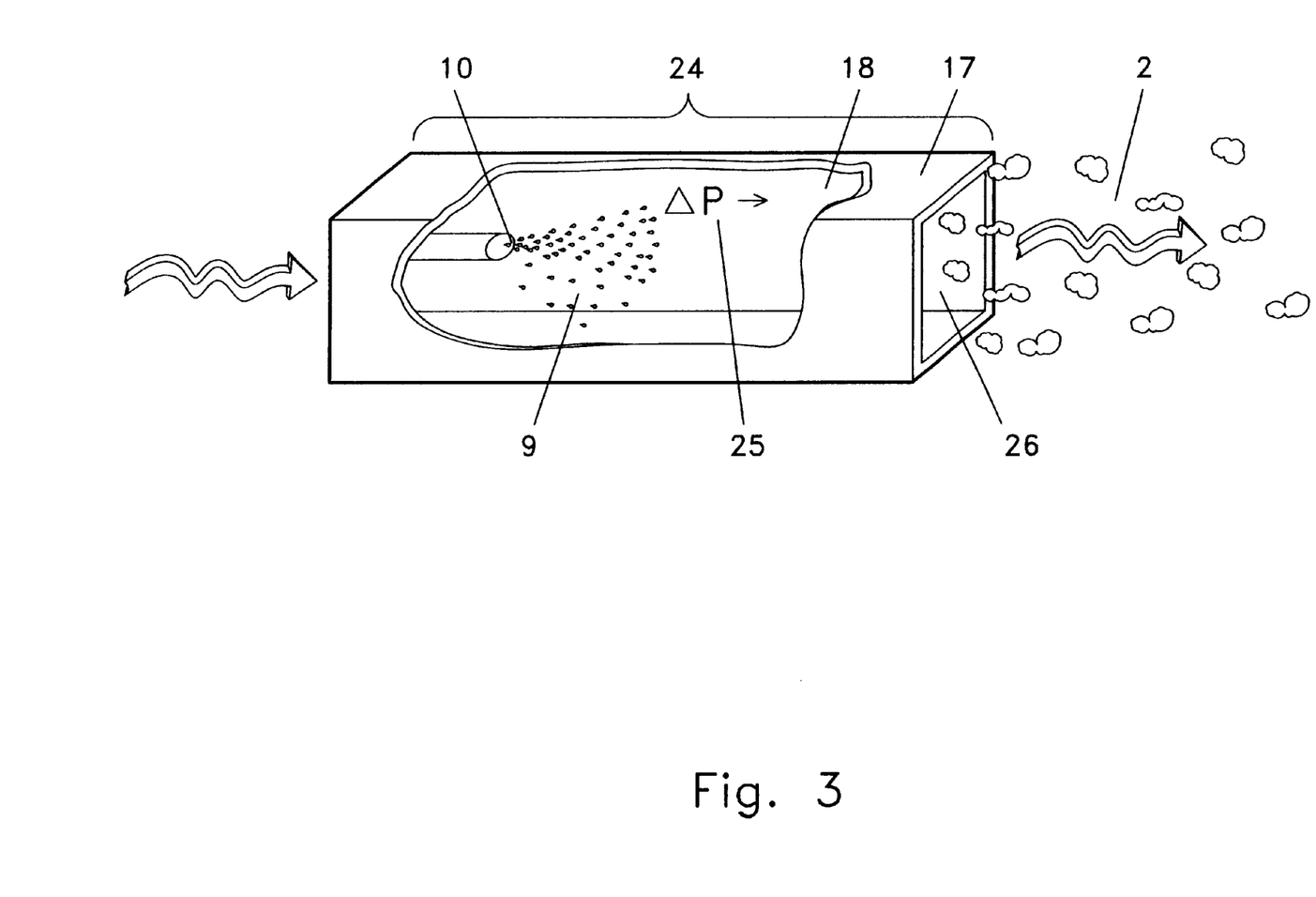
FIG. 3 is a cut away drawing of a basic embodiment of the invention that provides a gas expansion compensator that generates a pressure gradient with the liquid prior to conversion to gas.

Moreover, embodiments of the gas expansion compensator invention can further include various embodiments of the pressurization element (3) and the liquid preheating element (5) as shown in FIG. 1. As such, in the gas expansion compensator embodiments of the invention, liquid can be pressurized and preheated prior to being dispersed from the nozzle (10) at the rates above-described and can still be used to generate the necessary pressure gradient to move the volume of gas generated from the liquid toward one of at least two apertures (26) as shown by FIG. 3. The gas expansion compensator embodiments of the invention can also include the elements for continuous removal of accumulated solids (13) as well as provide the gravity collection element (21) as shown by FIG. 2, and as above-described.

Figure 4:
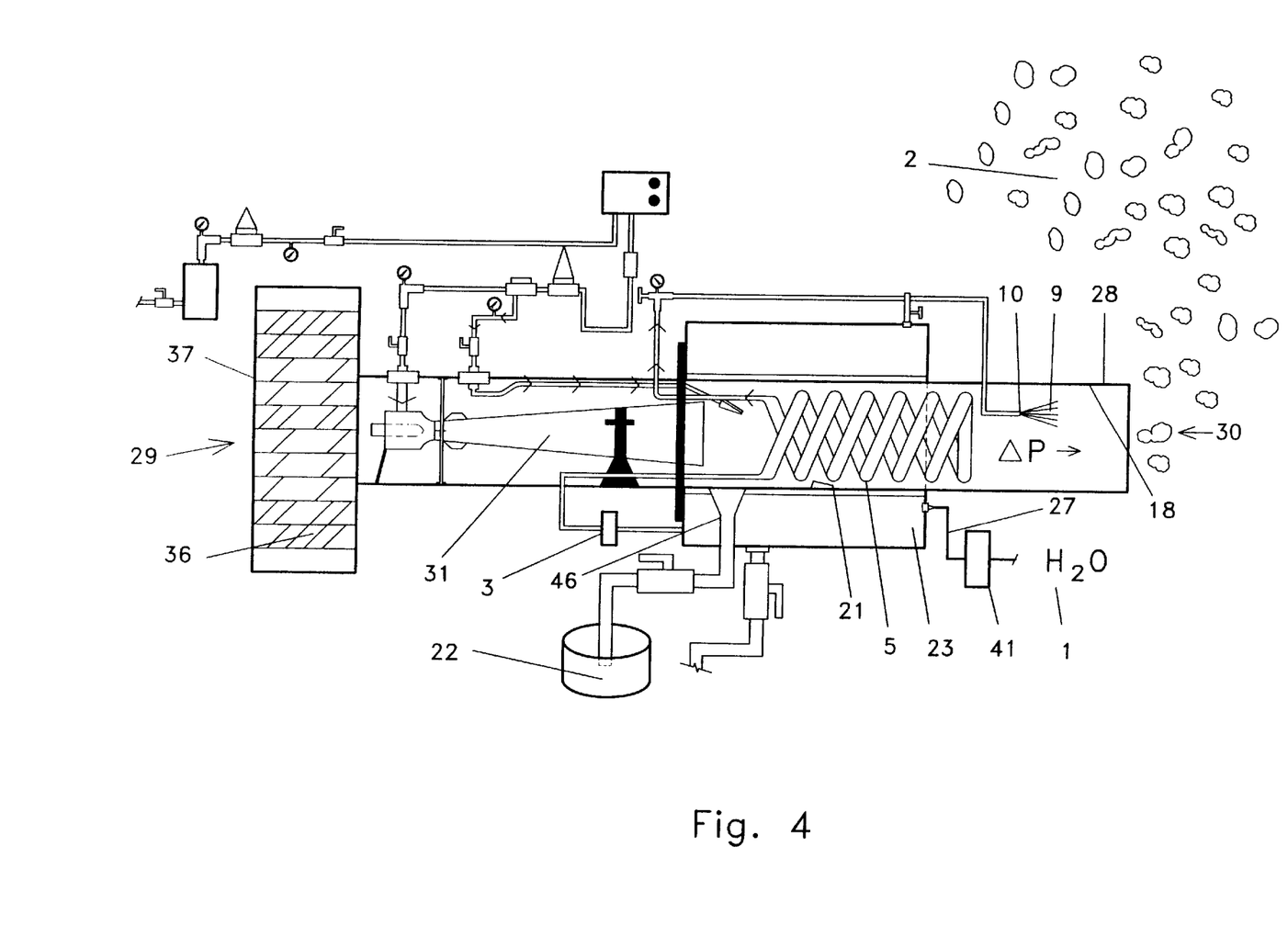
FIG. 4 shows a specific embodiment of the liquid-gas converter invention.

Now referring to FIG. 4, a preferred embodiment of the invention comprises a liquid source (1), a pressurization element (3) responsive to the liquid source, a liquid transfer element (27) coupled to the liquid pressurization element (3), an enclosure comprising a burner tube (28) having an interior surface (18) and an exterior surface and a first end (29) and a second end (30). An energy source comprising a burner (31) can be located within the burner tube (28) and the heat generated by the burner (31) is responsive to at least one nozzle (10) located within the burner tube (28).

The burner (31) of the preferred embodiment of the invention can be fueled by natural gas which may be obtained from gas wells at the site where liquid is being converted to gas (or from an alternate source). As an example of one embodiment of the invention, a pressure regulator can be attached to the outlet valve on the dehydrator coupled to a gas well which may reduce gas pressure to about 50 pounds per square inch. A one-half inch transfer tube may be attached from the regulator to a gas scrubber that Add will automatically shut off the gas supply in the event the separator allows too much water to suddenly enter the evaporation gas supply system. From the scrubber a second pressure regulator may be installed to precisely regulate gas pressure to the burner (31). A one-half gas transfer tube can be run from the scrubber to the burner (31) supplying the burner with gas. Naturally, the regulators, hoses and other components are sized to the actual application as one with skill in the art would readily understand. Alternatively, as discussed above, the burner (31) may also be fueled with propane, kerosene, oil, gasoline, alcohol, or similar combustible gases and fluids.

Figure 5:
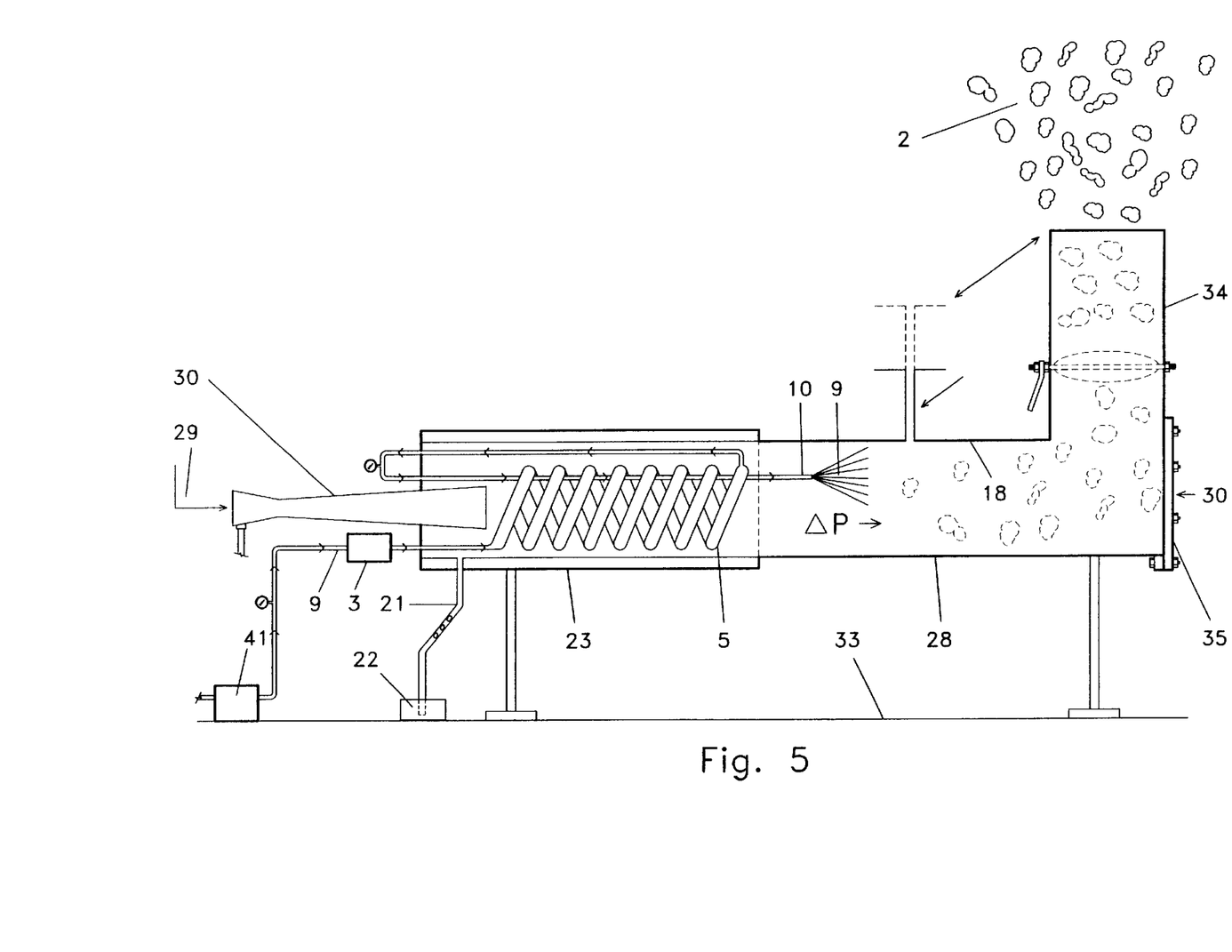
FIG. 5 shows a specific embodiment of the liquid-gas converter invention with a stack.

The burner tube (28) can have a substantially cylindrical configuration. A preferred embodiment of the cylindrical burner tube (28) can have an internal diameter of about fourteen inches which can be provided by using Schedule 40 pipe, and have a length of about twelve feet. These embodiments of the invention can be operated with the longitudinal axis of the burner tube (28) vertical to the supporting surface (33) having the first end (29) proximate to such supporting surface. When the cylindrical burner tube (28) is operated with the longitudinal axis substantially horizontal to the supporting surface (33), the invention may further comprise a burner stack (34) and an end cap (35) coupled to the second end (30). The burner stack can also be of cylindrical configuration with an internal diameter of about fourteen inches, which can be provided by using Schedule 40 pipe. The end cap (35) can be removed to maintenance of the components within the burner tube (28).

These preferred embodiments of the invention can further comprise a liquid preheating element (5) coupled to the liquid transfer element (27). In the embodiment of the invention shown in FIGS. 4 and 5, the liquid preheating element (5) has a location within the burner tube (28) and conducts heat from the flame generated by the burner (31). In other embodiments of the invention the liquid preheating element (5) can be responsive to the exterior surface of the burner tube (28) and conducts heat from the exterior surface of the burner tube (28) to the liquid within the liquid preheating element (5). The liquid preheating element as shown in FIGS. 4 and 5 can be a coil of metal tube having an internal diameter of between about one-half inch to about one and one-half inches. The length can vary between about two feet to about forty feet.

The pressurization element (3) and the liquid preheating element (5) can be used to increase the pressure and temperature of the liquid (1) as above-described and as shown by FIG. 1. As discussed in detail above, increasing the temperature and pressure of the liquid prior to dispersing the liquid allows for increased liquid to gas conversion which for the embodiments of the invention shown in FIGS. 4 and 5 can be in the range of about 4 gallons per minute to about 12 gallons per minute, or even more.

Importantly, having the flame of the burner (31) responsive to the nozzle (10), the liquid, whether preheated or not, can be dispersed directly into the flame to increase the efficiency of the liquid to gas conversion process.

Referring to FIG. 4, the invention can further include a cooling element (23) that interfaces with a portion of the exterior surface of the burner tube (28). In the embodiment of the invention shown a sleeve or jacket encases part of the length of the burner tube (28). An arrester (36) can also be coupled to the first end (29) of the burner tube. The arrester (36) can comprise an expansion chamber to reduce the velocity of gases or substances that may be move toward the first end (29) of the burner tube (28). Further restrictor elements (37) may be included to further diffuse or further reduce the velocity of such movement.

The embodiments of the invention shown by FIGS. 4 and 5 can also use the interior surface (18) of the burner tube (28) as a deposition surface (12) for solids (13), as a condensation surface (14) (the temperature of which can be adjusted by the use of cooling element (23)) to generate condensate (15), provide a condensation transfer surface (16), and when the second end is elevated slightly can provide a gravity collection element (21) for collection of solids (13) dissolved in the condensate (15) which can be continuously collected during the operation of the invention into solution repository (22). An alternative to generation of condensate, can be to disperse a volume of liquid (1) from nozzle (10) that is greater than the liquid to gas conversion rate. The excess volume can be between about one percent to about 10 percent of the total liquid volume dispersed.

The embodiments of the invention shown by FIGS. 4 and 5 can also include the gas expansion compensator above-described and shown by FIG. 3. Nozzle (10) can be adjusted to disperse liquid at a rate that generates a pressure gradient (24) within the burner tube (28) having sufficient change in atmospheric pressure per unit distance to move the volume of gas (2) from the burner tube (28) at the second end (30) while drawing sufficient air into the first end (29) of the burner tube (28) for the continuous ignition of fuel by the burner (31). Unlike conventional technology fans, blowers, or the like are not required to form the pressure gradient.

As can be understood from FIGS. 4 and 5, a pressurization element (3) pressurizes liquid (1), such as water, which enters the preheating element (5) installed in the burner tube (28). After passing though the preheating element (5) the pressurized water is discharged through the nozzle (10) having openings which disperse, spray, or a mist pressurized, preheated liquid (9) directly into the flame of burner (31). Substantially all the liquid (1) can be converted to gas and the expanding gases moved by the gas expansion compensator along pressure gradient (24) toward the second end (30) of the burner tube (28). Air is drawn in by the pressure gradient at the first end (29) of the burner tube (28) to maintain the ignition of fuel at burner (31). Substances dissolved or associated with the liquid accumulate on a deposition surface (12) comprising a portion of the interior surface (18) of the burner tube (28). A portion of the gas generated can be condensed on a condensation surface (14) having a location on the interior surface (18) of the burner tube (28) further toward the second end (30) of the burner tube (28). The condensate moves toward the first end (29) of the burner tube (28) on a condensate transfer surface (16) which can comprise the interior surface (18) of the burner tube (28) located between the deposition surface (12) and the condensation surface (14). The condensate (15) combines with the accumulated solids (13) to form a solution (20) that is collected by the gravity collection element (21) that can comprise the portion of the interior surface (18) of the burner tube (28) between the deposition surface and the outlet (46) to the solution repository (22).

Figure 6:
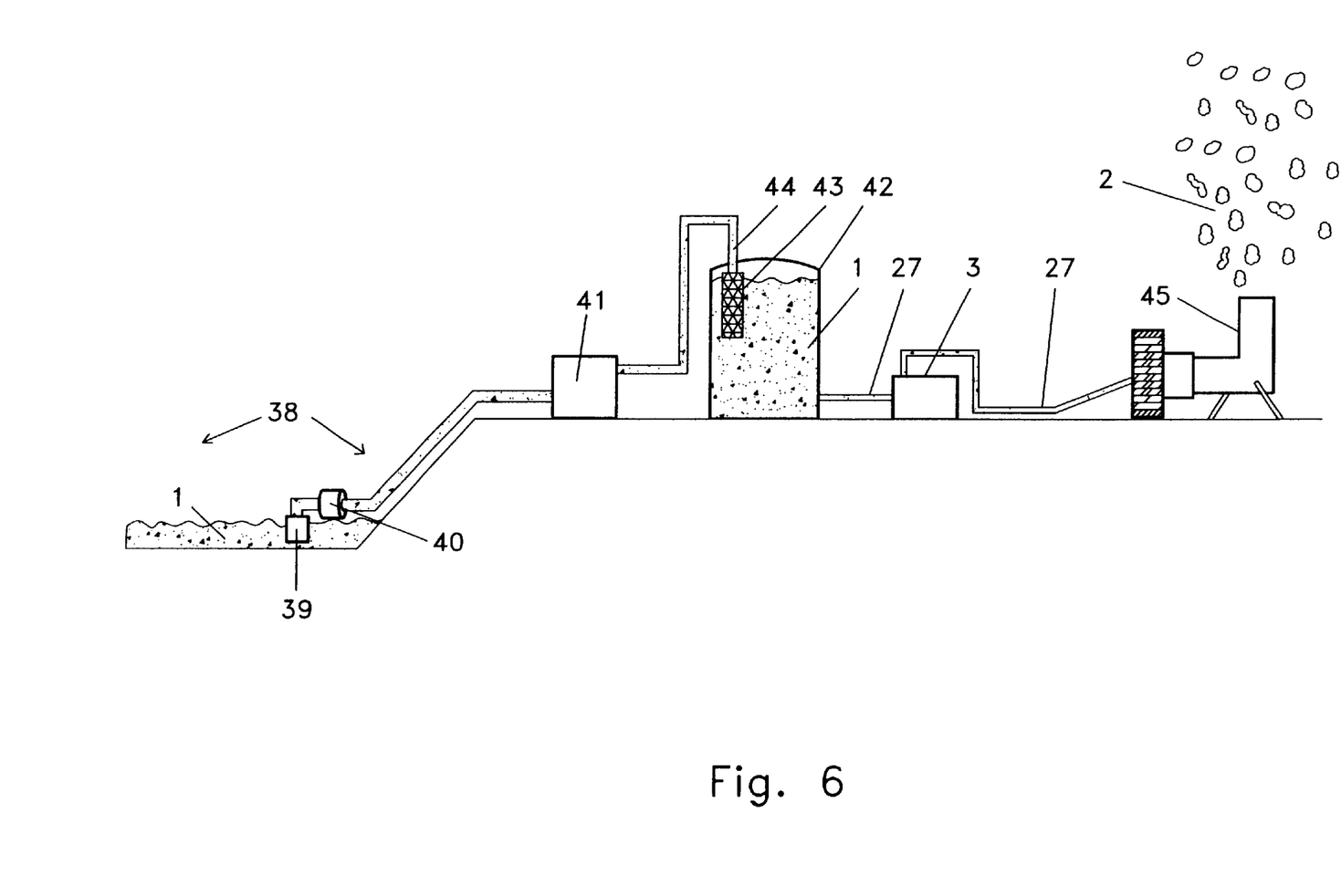
FIG. 6 shows the relationship of components that make up a specific embodiment of the invention.

Now referring to FIG. 6, which shows a particular embodiment of a gas-liquid converter in a typical operating environment. Water (or other liquid to be evaporated) (1) can be withdrawn from a water pit (or from a tank or other liquid source) (38) through a liquid pick up element (39). A liquid pick up element float (40) may assist in positioning the liquid pick up element (39) relative to the spice of the liquid (1) in the liquid source (38). The water or liquid to be converted to gas may then be drawn up by a pump (or distributed by gravity or otherwise) (41) and discharged to a holding tank (or other liquid containment device) (42). The pump may, for example, may be a centrifugal style 1 inch to 3 inch discharge size pump.

The liquid (1) may be filtered before being pressurized so as not to clog the nozzle (10) apertures. To filter the liquid (1), the water can be pumped though a filter system (43). The filter system (43) may be, for example, a screen preferably not larger than 100 mesh placed at the discharge point (44) going into liquid containment tank (42). Alternately, the filter system (43) can be a configured like a large sock placed in the opening of the filtered water tank where the liquid (1) is discharged into the containment tank (42). Other types of filter configurations could also be used. Naturally, the filter may be made from a variety of materials such as metal, plastic, paper, or composite of such materials.

The pressurization element (3) can be a positive displacement type pump or can be an air compressor as above-described. The pressurization element (3) can be powered by gasoline, natural gas, diesel, electricity, or otherwise. A liquid transfer element (27) may be attached to the containment tank (42) at the bottom allowing the water to gravity flow into the pressurization element (3). The pressurized discharge of water is connected by the liquid transfer element (27) to the various embodiments of the invention above-described.

The discussion included in this PCT application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in functionally-oriented terminology, each aspect of the function is accomplished by a device, subroutine, or program. Apparatus claims may not only be included for the devices described, but also method or process claims may be lo included to address the functions the invention and each element performs. Neither the description nor the terminology is intended to limit the scope of the claims which now be included.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "liquid-gas converter" should be understood to encompass disclosure of the act of "converting liquid-gas"—whether explicitly discussed or not—and, conversely, were there only disclosure of the act of "converting liquid-gas", such a disclosure should be understood to encompass disclosure of a "liquid-gas converter" and even a means for "converting liquid-gas". Such changes and alternative terms are to be understood to be explicitly included in the description.

Additionally, the various combinations and permutations of all elements or applications can be created and presented. All can be done to optimize the design or performance in a specific application.

Any acts of law, statutes, regulations, or rules mentioned in this application for patent: or patents, publications, or other references mentioned in this application for patent are hereby incorporated by reference. Specifically, U.S. patent application No. 60/199,289 is hereby incorporated by reference herein including any figures or attachments, and each of references in the following table of references are hereby incorporated by reference.

| DOCUMENT NO. | DATE | NAME | CLASS | SUBCLASS | FILING DATE |
|---|---|---|---|---|---|
| 2,343,458 | | | | | |
| 3,511,236 | 5/12/70 | Conlin et al. | 128 | 187 | 4/8/68 |
| 3,546,428 | 12/8/70 | Omohundro | 219 | 271 | 10/24/68 |
| 3,695,066 | 10/3/72 | Doyel | 68 | 222 | 3/16/70 |
| 3,742,629 | 7/3/73 | Plasko et al. | 38 | 69 | 8/30/71 |
| 3,745,306 | 7/10/73 | Naritomi | 392 | 335 | 4/7/71 |
| 4,399,349 | 08/16/83 | Derning et al. | 219 | 276 | 03/30/81 |
| 4,449,849 | 05/22/84 | Horn et al. | 405 | 52 | 07/19/82 |
| 5,082,525 | 1/21/92 | Travis | 159 | 16.1 | 1/30/90 |
| 5,582,680 | 12/10/96 | Vankouwenberg et al. | 159 | 23 | 11/30/94 |
| 5,775,840 | 07/07/98 | Knieper et al. | 405 | 128 | 09/18/96 |

"ENCON -Entrainment Contained Evaporator", PSI Water Systems, http://www.evaporator.com/encon.html, April 22, 2001, 4 pages "Industrial All-Electric Wastewater Evaporator", HBE Series, Landa Water Cleaning Systems, http://www.landa-inc.com/pages/evaporators.asp?src=:showModList&Series=52, April 22, 2001, 1 page "Industrial Natural-Gas Wastewater Evaporator", HBG Series, Landa Water Cleaning Systems, http://www.landa-inc.com/pages/evaporators.asp?src:=showModList&Series=51, April 22, 2001, 5 pages "Industrial Wastewater Evaporator with Submerged Combustion Technology", WB Series, Landa Water Cleaning Systems, http://landa-inc.com/pages/evaporators.asp?src=showModList&Series=53, April 22, 2001, 4 pages In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference. However, as to each of the above, to the extent that such information or statements incorporated by reference might be considered inconsistent with the patenting of this/these invention(s) such statements are expressly not to be considered as made by the applicant(s).

In addition, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible in countries such as Australia and the like.

Thus, the applicant(s) should be understood to have support to claim at least: i) each of the liquid to gas conversion devices described herein, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, and the x) the various combinations and permutations of each of the elements disclosed.

In addition, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible in countries such as Australia and the like.

We claim:

1. An apparatus to convert a liquid to a gas, comprising:
   a. a liquid source;
   b. a liquid pressurization element responsive to said liquid source;
   c. a liquid transfer element coupled to said liquid pressurization element;
   d. a burner tube having an interior surface and an exterior surface, and wherein said burner tube has a first end and a second end;
   e. a burner located within said burner tube; and
   f. at least one nozzle coupled to said liquid transfer element, wherein said at least one nozzle has a location within said burner tube, and wherein said at least one nozzle is responsive to heat from said burner.

2. An apparatus to convert a liquid to a gas as described in claim 1, where in said burner tube has a substantially cylindrical configuration.

3. An apparatus to convert a liquid to a gas as described in claim 2, wherein said substantially cylindrical configuration has a diameter of about fourteen inches (about 0.36 meters).

4. An apparatus to convert a liquid to a gas as described in claim 3, wherein said burner tube comprises Schedule 40 pipe.

5. An apparatus to convert a liquid to a gas as described in claim 2, wherein said burner tube has a length of about twelve feet (about 3.65 meters).

6. An apparatus to convert a liquid to a gas as described in claim 2, wherein said burner tube has a longitudinal axis substantially horizontal to a supporting surface.

7. An apparatus to convert a liquid to a gas as described in claim 6, further comprising a burner stack coupled to said burner tube, wherein said burner stack has a longitudinal axis substantially perpendicular to the longitudinal axis of said burner tube.

8. An apparatus to convert a liquid to a gas as described in claim 7, wherein said burner stack has a substantially cylindrical configuration.

9. An apparatus to convert a liquid to a gas as described in claim 8, wherein said burner stack has diameter of about fourteen inches (about 0.36 meters).

10. An apparatus to convert a liquid to a gas as described in claim 9, wherein said burner stack comprises Schedule 40 pipe.

11. An apparatus to convert a liquid to a gas as described in claim 7, further comprising an end cap coupled to said second end of said burner tube.

12. An apparatus to convert a liquid to a gas as described in claim 2, wherein said burner tube has a substantially vertical orientation to said supporting surface.

13. An apparatus to convert a liquid to a gas as described in claim 1, wherein said burner comprises a SB 38/24-14 2.5 MM BTU per hour.

14. An apparatus to convert a liquid to a gas as described in claim 13, wherein said burner uses natural gas as a feel.

15. An apparatus to convert a liquid to a gas as described in claim 14, wherein said natural gas is derived in situ from a natural gas well.

16. An apparatus to convert a liquid to a gas as described in claim 1, wherein said at least one nozzle disperses said liquid at a rate between about four gallons per minute to about twelve gallons per minute (about 18 liters per minute to about 54 liters per minute).

17. An apparatus to convert a liquid to a gas as described in claim 16, wherein said burner generates a flame, and wherein said liquid dispersed from said at least one nozzle is applied directly to said flame.

18. An apparatus to convert a liquid to a gas as described in claim 16, wherein said at least one nozzle disperses said liquid as a spray.

19. An apparatus to convert a liquid to a gas as described in claim 1, wherein said liquid pressurization element establishes said liquid at a pressure between 100 pounds per square inch and 3000 pounds per square inch within said liquid transfer element.

20. An apparatus to convert a liquid to a gas as described in claim 19, wherein said liquid transfer element has an inside diameter of about one quarter inch to about one inch (about 0.64 centimeters to about 2.54 centimeters).

21. An apparatus to convert a liquid to a gas as described in claim 1, further comprising a cooling element coupled to a portion of said exterior surface of said burner tube.

22. An apparatus to convert a liquid to a gas as described in claim 21, wherein said liquid circulates through said cooling element prior to being dispersed by said nozzle.

23. An apparatus to convert a liquid to a gas as described in claim 1, further comprising a liquid preheating element coupled to said liquid transfer element.

24. An apparatus to convert a liquid to a gas as described in claim 23, wherein said liquid preheating element is responsive to said exterior surface of said burner tube, and wherein said liquid preheating element conducts heat from said exterior surface of said burner tube to said liquid.

25. An apparatus to convert a liquid to a gas as described in claim 23, wherein said liquid preheating element has a location within said burner tube, and wherein said liquid preheating element conducts heat from said flame of said burner to said liquid.

26. An apparatus to convert a liquid to a gas as described in claim 23, wherein said liquid preheating element comprises a coil of metal tube.

27. An apparatus to convert a liquid to a gas as described in claim 26, wherein said metal tube has an internal diameter between about one-half inch to about one and one half inches (about 1.3 centimeters to about 3.8 centimeters).

28. An apparatus to convert a liquid to a gas as described in claim 26, wherein said metal tube has a length between about two feet to about forty feet (about 0.61 meters to about 12.2 meters).

29. An apparatus to convert a liquid to a gas as described in claim 23, wherein said liquid is heated to a temperature between about 150 degrees Fahrenheit to about 1000 degrees Fahrenheit (about 65.6 degrees Celsius to about 537.8 degrees Celsius).

30. An apparatus to convert a liquid to a gas as described in claim 1, further comprising a concentration of other substances in said liquid.

31. An apparatus to convert a liquid to a gas as described in claim 30, further comprising a solids deposition surface on which solids accumulate when said liquid converts to gas.

32. An apparatus to convert a liquid to a gas as described in claim 31, wherein said solids deposition surface comprises a portion of said interior surface of said burner tube.

33. An apparatus to convert a liquid to a gas as described in claim 31, further comprising a condensation surface on which a portion of said gas condenses.

34. An apparatus to convert a liquid to a gas as described in claim 33, wherein said condensation surface comprises a portion of said interior surface of said burner tube.

35. An apparatus to convert a liquid to a gas as described in claim 33, further comprising a condensate transfer surface responsive to said condensation surface and said solids deposition surface.

36. An apparatus to convert a liquid to a gas as described in claim 1, further comprising a gas expansion compensator responsive to an increased volume of gas within said burner tube, wherein said gas expansion compensator generates a pressure gradient having sufficient change in atmospheric pressure per unit distance to move said increased volume of gas away from said flame of said burner.

37. An apparatus to convert a liquid to a gas as described in claim 36, wherein said gas expansion compensator comprises said liquid disposed through said nozzle a rate sufficient to establish said pressure gradient within said burner tube.

38. An apparatus to convert a liquid to a gas as described in claim 1, further comprising an arrester coupled to said first end of said burner tube.

39. An apparatus to convert a liquid to a gas as described in claim 38, wherein said arrestor comprises an expansion chamber and restrictor elements.

* * * * *